000

United States Patent
Abrishamchian et al.

(10) Patent No.: US 7,602,572 B2
(45) Date of Patent: Oct. 13, 2009

(54) STABILITY MARGINS AND ERROR RECOVERY IN SERVO CONTROL SYSTEMS

(75) Inventors: Mirmehdi L. Abrishamchian, Shrewsbury, MA (US); Travis Hein, Holliston, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 483 days.

(21) Appl. No.: 11/709,184

(22) Filed: Feb. 21, 2007

(65) Prior Publication Data

US 2007/0268797 A1    Nov. 22, 2007

Related U.S. Application Data

(60) Provisional application No. 60/747,463, filed on May 17, 2006.

(51) Int. Cl.
*G11B 5/596* (2006.01)
*G11B 21/02* (2006.01)
(52) U.S. Cl. ........................................................ 360/75
(58) Field of Classification Search ................ None
See application file for complete search history.

(56) References Cited

U.S. PATENT DOCUMENTS

| | | | | |
|---|---|---|---|---|
| 5,281,930 | A * | 1/1994 | Taromaru et al. | 332/127 |
| H1410 | H * | 1/1995 | Hartley | |
| 6,724,563 | B2 * | 4/2004 | Kobayashi et al. | 360/78.09 |
| 6,927,934 | B2 * | 8/2005 | Atsumi | 360/75 |
| 7,268,968 | B2 * | 9/2007 | Semba et al. | 360/77.02 |
| 7,345,841 | B2 * | 3/2008 | Baugh et al. | 360/75 |

OTHER PUBLICATIONS http://www.facstaff.bucknell.edu; *Relative Stability*; Jan. 22, 2007.

* cited by examiner

*Primary Examiner*—Hoa T Nguyen
*Assistant Examiner*—James L Habermehl
(74) *Attorney, Agent, or Firm*—David K. Lucente

(57) ABSTRACT

Adjusting a servo control system includes identifying a gain crossover frequency for the servo control system, generating a sensitivity function for the servo control system, measuring a sensitivity peak in the sensitivity function, comparing a frequency of the sensitivity peak to the gain crossover frequency, and adjusting the servo control system in response to the comparison of the frequency of the sensitivity peak to the gain crossover frequency.

23 Claims, 9 Drawing Sheets

STABILITY MARGINS AND ERROR RECOVERY IN SERVO CONTROL SYSTEMS

RELATED APPLICATION

This application claims the benefit of and priority to U.S. Provisional Patent Application No. 60/747,463 entitled "Method of Monitoring and Adjusting Stability Margin in Hard Disk Drives," filed May 17, 2006, the disclosure of which is hereby incorporated herein by reference as if set forth in its entirety.

BACKGROUND

The present invention generally relates to monitoring stability margins and responding appropriately to instability in closed loop systems and, more particularly, to monitoring stability margins in servo control systems of digital data storage devices.

Disk drives are digital data storage devices that can store and retrieve large amounts of data in a fast and efficient manner. A typical disk drive includes a plurality of magnetic recording disks that are mounted to a hub of a spindle motor and rotated at a high speed. A plurality of actuator arms including read/write transducers disposed at ends thereof are disposed adjacent to surfaces of the disks. The transducers are used to transfer data between the disks and a host computer. The transducers can be radially positioned over the disks by a rotary actuator and a closed loop, digital servo system, and can fly proximate the surfaces of the disks upon air bearings.

A plurality of nominally concentric tracks can be defined on each disk surface. A preamp and driver circuit generates write currents that are used by the transducer to selectively magnetize the tracks during a data write operation and amplifies read signals detected by the transducer from the selective magnetization of the tracks during a data read operation. A read/write channel and interface circuit are connected to the preamp and driver circuit to transfer the data between the disks and the host computer.

The servo system can operate in two primary modes: seeking and track following. During a seek operation, a selected transducer is moved from an initial track to a destination track on the corresponding disk surface. The servo system applies current to an actuator coil to first accelerate and then decelerate the transducer toward the destination track.

The actuator arms can be moved very quickly in response to the actuator current. The acceleration of the actuator in response to the applied current excites resonances, or flexible modes, of the actuator. Vibrations at these modes may be difficult to attenuate and/or may interfere with drive operation. For example, if the actuator arms are excited by signals having frequency components at the suspension modes, the system could experience large tracking errors, problems with off-track detection algorithms, and/or instability. Accordingly, many servo control systems use one or more notch filters in the control loop to attenuate the effects of these resonances. Plant is a generic term used in control systems to refer to the mechanical system being controlled. It will be appreciated that in the context of a disk drive, the "plant" refers to the electromechanical device that positions the transducers adjacent the tracks in response to a control signal, and includes the actuator coil, actuator arms and transducers.

The term "system mode" is used herein to identify the first major flexible mode in a plant transfer function for an actuator of a hard drive. The shape of the system mode of a disk drive (i.e. the pattern in which the mechanical components of the plant vibrate) may be a consequence of both translation of the actuator bearing as well as in-phase sway of the actuator arms and coil. The system mode can be identified from a closed loop plant transfer function. Typically, the mechanical components of the actuator are designed to have the system mode at a particular frequency, and the notch filter(s) are designed accordingly.

In a mass production environment, the actual types of actuators used in hard disk drives may change for various reasons. The introduction of new vendors, process variation at the manufacturing site, and/or design modifications may alter the family of plants. Different actuators will have different suspension modes due to differences in design and/or manufacture thereof. High frequency suspension modes of the actuator may be of special interest, because if these modes change, the notch filters may not adequately attenuate the effects of these resonances that may cause the problems described above. Changes in the suspension modes of a disk drive may also provide an early warning of a problem at the component level.

SUMMARY

Some embodiments adjust a servo control system by identifying a gain crossover frequency for the servo control system, generating a sensitivity function for the servo control system, measuring a sensitivity peak in the sensitivity function, comparing a frequency of the sensitivity peak to the gain crossover frequency, and adjusting the servo control system in response to the comparison of the frequency of the sensitivity peak to the gain crossover frequency.

A servo control system according to some embodiments includes an actuator that moves in response to a control signal, a notch filter that filters the control signal, and a controller that generates the control signal. The controller identifies a gain crossover frequency for the servo control system, measures a sensitivity function for the servo control system, identifies a sensitivity peak in the sensitivity function, that compares a frequency of the sensitivity peak to the gain crossover frequency, and adjusts the gain of the controller in response to the comparison of the frequency of the sensitivity peak to the gain crossover frequency.

Methods of calibrating a servo control system according to some embodiments include measuring a sensitivity function for the servo control system, and calibrating the servo control system in response to a comparison of a frequency of a sensitivity peak of the sensitivity function to a gain crossover frequency of the servo control system.

BRIEF DESCRIPTION OF THE DRAWINGS

The accompanying drawings, which are included to provide a further understanding and are incorporated in and constitute a part of this application, illustrate certain embodiment(s). In the drawings.

DETAILED DESCRIPTION OF EMBODIMENTS

The present invention now will be described more fully hereinafter with reference to the accompanying drawings, in which embodiments are shown. However, this invention should not be construed as limited to the embodiments set forth herein. Rather, these embodiments are provided so that this disclosure will be thorough and complete, and will fully convey the scope to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions. As used herein the term "and/or" includes any and all combinations of one or more of the associated listed items. Similarly, a list of items separated by the symbol "/" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention may be embodied as apparatus, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The present invention is described below with reference to block diagrams and/or operational illustrations of apparatus, methods, and computer program products according to embodiments. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 1:
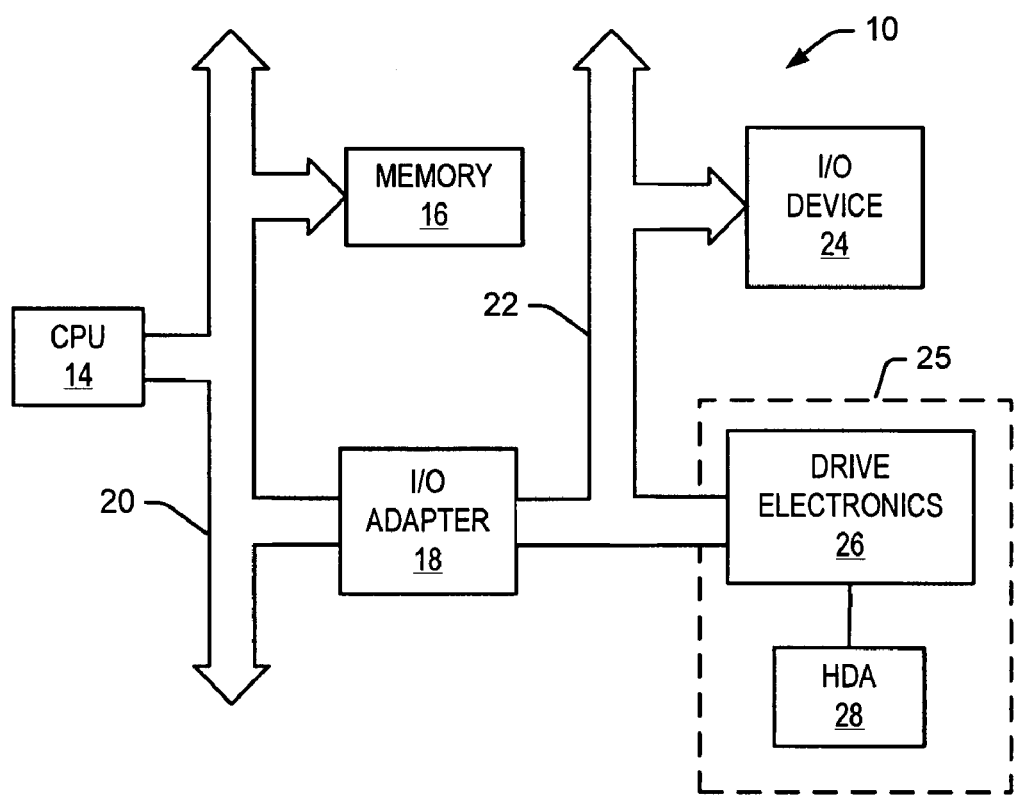
FIG. 1 is a block diagram of an exemplary computer system that includes a disk drive.

Referring to FIG. 1, an exemplary computer system 10 is shown that includes a central processing unit ("CPU") 14, a main memory 16, and I/O bus adapter 18, all interconnected by a system bus 20. Coupled to the I/O bus adapter 18 is I/O bus 22, that may be, for example, a small computer system interconnect (SCSI) bus, firewire bus, and/or a universal serial bus. The I/O bus 22 supports various peripheral devices 24 and a data storage unit such as a disk drive 25. The disk drive 25 includes drive electronics 26 and a head disk assembly 28 ("HDA").

Figure 2:
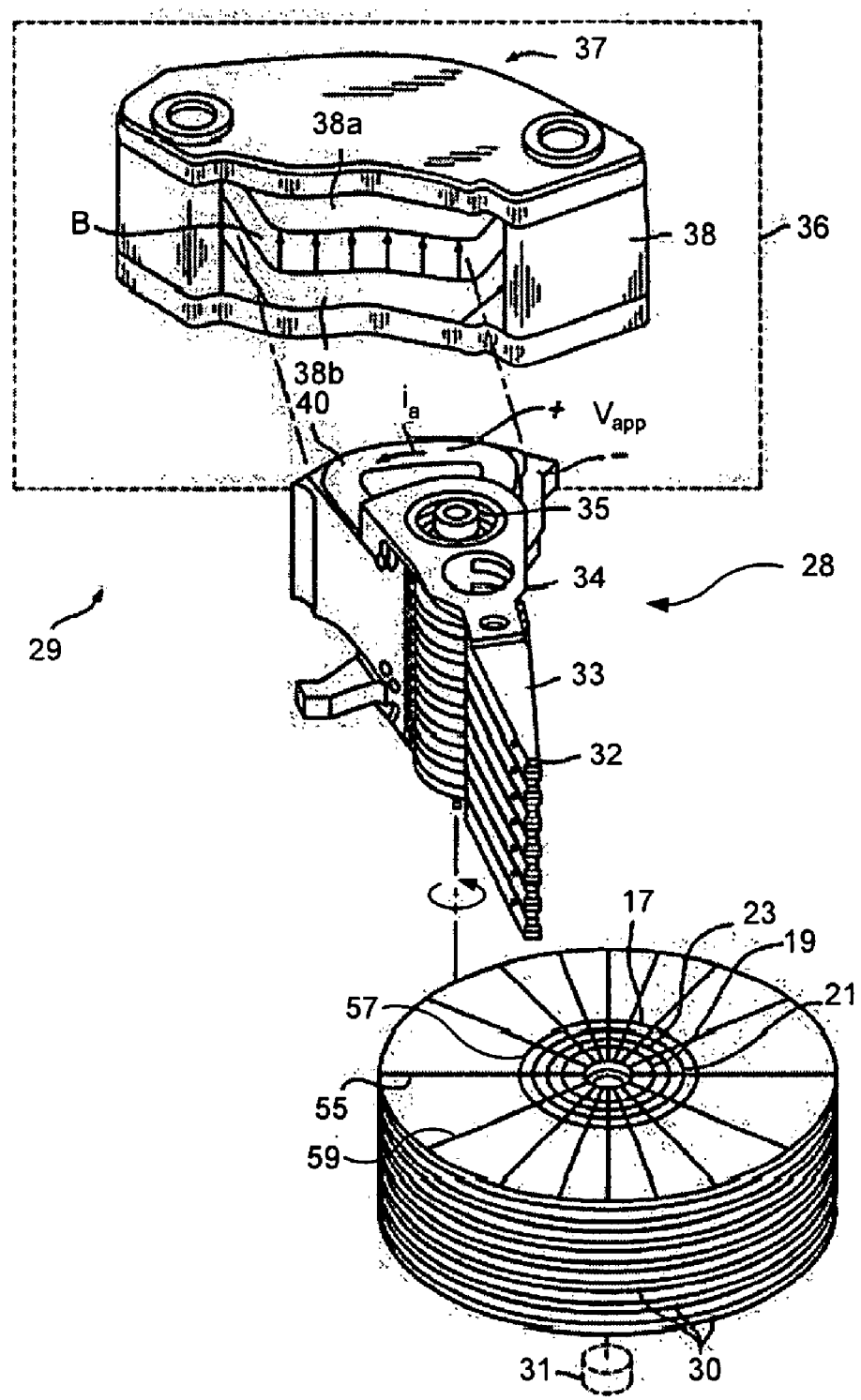
FIG. 2 is a diagram of an exemplary head disk assembly of the disk drive.

Referring to FIG. 2, an exemplary embodiment of the HDA 28 of FIG. 1 is shown that includes an actuator 29 and disks 30 that can be rotated by a spindle motor 31. Data can be stored on the disks 30 in concentric circular data tracks 17 that are divided into alternating data sectors 57 and servo sectors 55. The servo sectors 55 are generally aligned in a radial fashion on the disks 30, and a group of servo sectors 55 that are radially aligned can sometimes be referred to as "spokes" 59. Since the disks 30 are rotated by spindle motor 31 at a constant angular velocity (e.g. 10,000 rpm), the spokes 59 pass under the transducers 32 at constant intervals. Thus, the number of spokes 59 passing beneath the transducers 32 may provide a measure of time between events.

The data can be written and read from the disks 30 via magnetic transducers 32 which are attached to flexible load beams 33 extending from actuator arms 34. The actuator arms 34 pivot about point 35 to move the load beams 33 in a radial direction over the storage surfaces of the disks 30 from an initial track 19 towards a target track 21 shown in FIG. 2 by example. At the target track 21, the magnetic transducers 32 can read from and/or write data on the disks 30. A motor 36 controls the radial movement of the actuator arms 34 in response to an input actuator current $i_a$. Although the disks 30 are described as magnetic disks for purposes of illustration, the disks 30 may alternatively be optical disks or any other type of storage disk which can have data storage tracks defined on one or both of its storage surfaces.

The exemplary motor 36 can include a magnet 37 containing two plates 38a, 38b coupled together via a pair of sidewalls to form a flat toroidal shaped member 38. A wire coil 40 attached to the actuator arms 34 is disposed between the two plates 38a and 38b. The magnet 37 may generate a constant magnetic field B between the plates 38a and 38b. When the input actuator current $i_a$ is passed through the coil 40 disposed in the magnetic field B, a torque is produced on the actuator arms 34 resulting in radial motion of the arms 34 about a pivot point 35. The polarity of the input actuator current $i_a$ determines the direction of the force applied to the actuator arms 34.

Figure 3A:
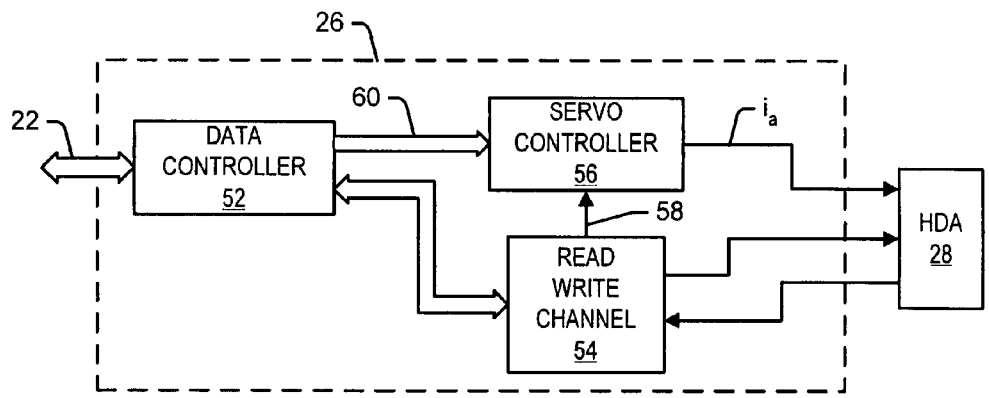
FIG. 3A is a block diagram of the drive electronics of the disk drive that is configured according to some embodiments.

Referring to FIG. 3A, the drive electronics 26 (FIG. 1) includes a data controller 52, a read/write channel 54, and a servo controller 56. A data transfer initiated by the CPU 14 to the disk drive 25 may involve, for example, a DMA transfer of data from the memory 16 onto the system bus 20 (FIG. 1). Data from the system bus 20 are transferred by the I/O adapter 18 onto the I/O bus 22. The data are read from the I/O bus 22 by the data controller 52, which formats the data into blocks with the appropriate header information and transfers the digital data to the read/write channel 54. The read/write channel 54 can operate in a conventional manner to convert data between the digital form used by the data controller 52 and the analog form used by the transducers 32. For the transfer from the CPU 14 to the HDA 28, the read/write channel 54 converts the data to an analog form suitable for writing by a transducer 32 to the HDA 28. The read/write channel 54 also provides servo positional information read from the HDA 28 to the servo controller 56 on lines 58. For example, the concentric data tracks 17 on the storage surface of a data disk 30 can be broken up and divided into segments by a plurality of regularly spaced apart embedded servo sectors 55 (FIG. 2). Each servo sector 55 can include transducer location information such as a track identification field and data block address, for identifying the track and data block, and burst fields to provide servo fine location information. The transducer location information can be used to detect the location of the transducer 32 in relation to that track and data block within the track. The transducer location information is induced into the transducer 32, converted from analog signals to digital data in the read/write channel 54, and transferred to the servo controller 56. The servo controller 56 can use the transducer location information for performing seek and tracking operations of the transducer 32 over the disk tracks 17.

The data controller 52 also provides data that identifies the target track location and the addressed data block on lines 60 to the servo controller 56. The time to perform a seek from between an initial track to a target track is typically known as "seek time". The servo controller 56 generates a current command, which is a voltage signal that is converted into the input actuator current $i_a$, and provided to the actuator 29 to move the transducer 32 radially across the disk 30. The seek time is thus dependent on the magnitude of the current command.

Figure 3B:
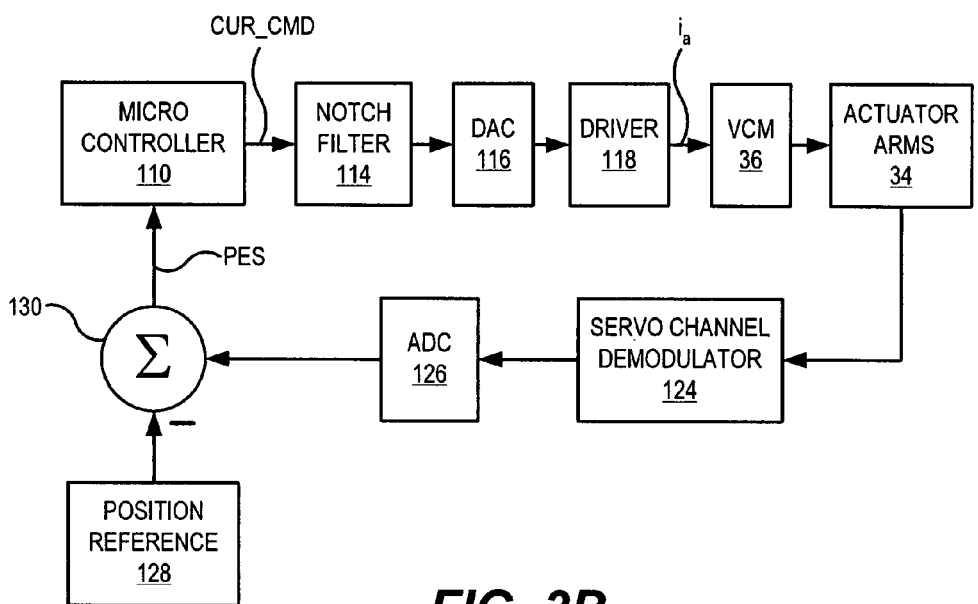
FIG. 3B is a block diagram of a servo controller configured according to some embodiments.

The servo controller 56 is described in more detail with reference to FIG. 3B. As shown therein, the servo controller 56 can include a microcontroller 110, a notch filter 114, a digital to analog converter (DAC) 116, and a current driver 118.

The microcontroller 110 is configured to generate a current command signal CUR_CMD. The current command CUR_CMD is filtered by a notch filter 114 that has one or more notch frequencies configured to selectively remove certain frequencies from the current command signal CUR_CMD. The current command signal CUR_CMD is filtered in order to reduce and/or remove frequency components that may otherwise cause unwanted vibrations that may be characteristic to the mechanical design of the actuator system.

The filtered current command signal is converted to analog and provided to the current driver 118. The current driver 118 converts the filtered current command into an input actuator current signal $i_a$, which is provided to the voice coil motor VCM 36. As discussed above, the motor 36 moves the actuator arms 34 in response to the input actuator current signal $i_a$. A servo channel demodulator 124 generates a servo signal that is proportional to the position of the actuator arms 34. The servo signal is digitized by an analog to digital converter 126 and subtracted at a summing node 130 from a position reference signal generated by a position reference generator 128. Accordingly, the servo channel demodulator 124, the analog to digital converter 126, the position reference generator 128 and the summing node 130 form a position error sensor that is configured to generate a position error signal (PES) indicative of a difference between a desired position of the transducers 32 and an actual position of the transducers 32 relative to a track of the data storage disk 30. The position error signal is provided to the controller 110, which uses the PES to control the current command CUR_CMD, to thereby adjust the position of the transducers 32 relative to the target track 21. Accordingly, the elements illustrated in FIG. 3B form a control loop for a servo control system in a disk drive 25.

High frequency suspension modes of the actuator may be of special interest to disk drive manufacturers, because if these modes change, the notch filter 114 may not adequately attenuate the effects of these resonances that may cause problems such as large tracking errors, problems with off-track detection algorithms, and/or instability. Some embodiments provide methods for monitoring high frequency suspension modes in a disk drive 25, and adjusting loop gain and/or notch filter properties to improve stability, depending on the frequency of an identified mode. Some embodiments may be used in the design of new notch filters or and/or for adjusting previously-designed notch filters after manufacturing. In addition, some embodiments may improve error recovery in disk drives 25 by providing more detailed information regarding the cause of a particular error.

There are several approaches that may be taken for monitoring the stability margin of high frequency modes in the disk drive 25, and for adjusting the disk drive 25 to account for the presence of high frequency modes. One approach is to raise the gain of the control loop until the loop becomes marginally stable, as measured by the tracking error (PES). There are several drawbacks to this approach. First, there may be no guarantee that the cause of instability is due to the presence of a mode in the frequency range of interest. For example, if one is interested in monitoring a suspension mode at 12 kHz, raising the gain of the control loop by 5 dB until marginal stability is achieved does not imply that the margin at 12 kHz is 5 dB. Whereas such an approach considers only gain changes, some embodiments consider simultaneous gain and phase changes.

Although gain and phase margin are traditional measures of control system stability, they may be misleading, as a system can have acceptable gain and phase margins, yet be close to instability. The maximum value of the sensitivity function |S| can provide a more accurate measure of stability margin than either gain or phase margin alone. In general, for a closed loop control system including a controller C having a frequency response $C(j\omega)$ and a plant P having a frequency response $P(j\omega)$, the sensitivity function is given by:

$$S = \frac{1}{1 + P(j\omega)C(j\omega)} \quad (1)$$

where $P(j\omega)C(j\omega)$ represents the open loop transfer function of the system.

Thus, the system may remain stable as long as $1+P(j\omega)C(j\omega) \neq 0$. In a disk drive 25, the sensitivity function S provides a measure of the change in position error signal in response to a disturbance at a particular frequency.

Vector gain margin (VGM) refers to the gain margin in the direction of the worst possible phase. The VGM corresponds to the peak of the sensitivity function. VGM, which accounts for simultaneous gain and phase changes, may be determined according to Equations (2) and (3) as follows:

$$S_\infty = \max_\omega |S(j\omega)| \quad (2)$$

$$VGM = \frac{S_\infty}{S_\infty - 1} \quad (3)$$

Figure 4A:
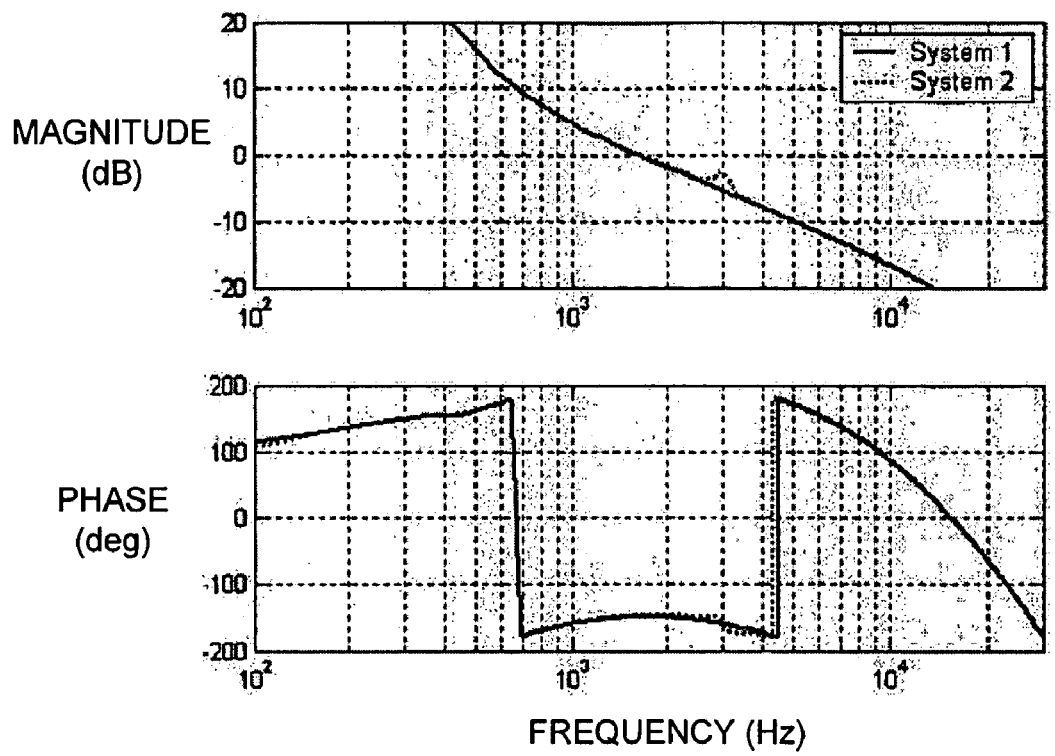
FIGS. 4A-4C are graphs of open loop transfer functions, sensitivity functions, and Nyquist plots for two comparison systems having different suspension modes.
Figure 4B:
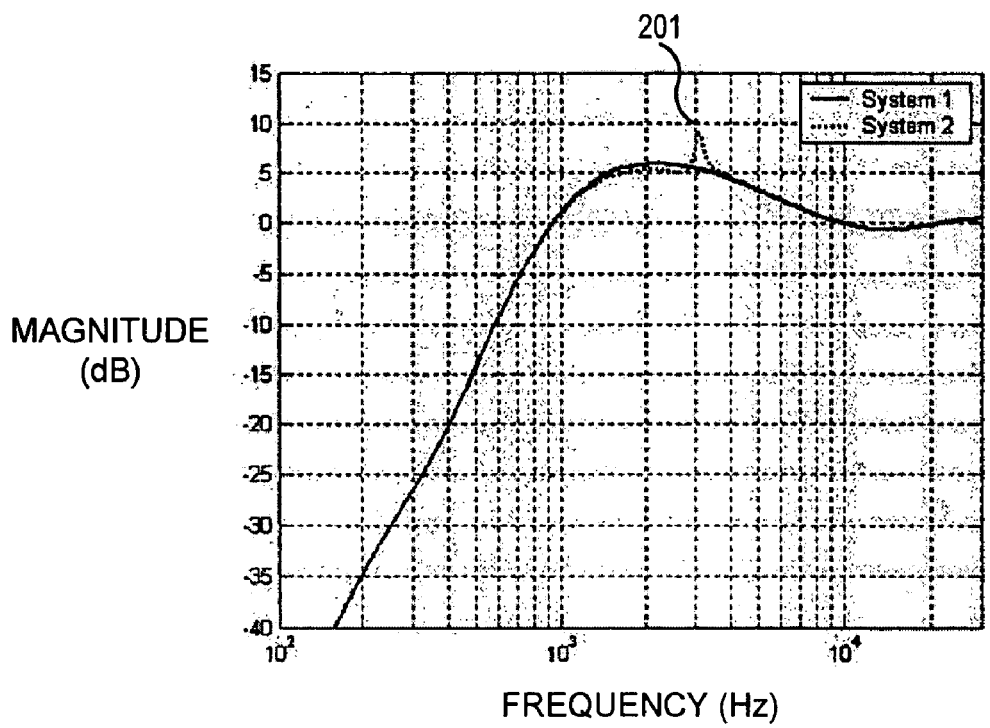
Figure 4C:
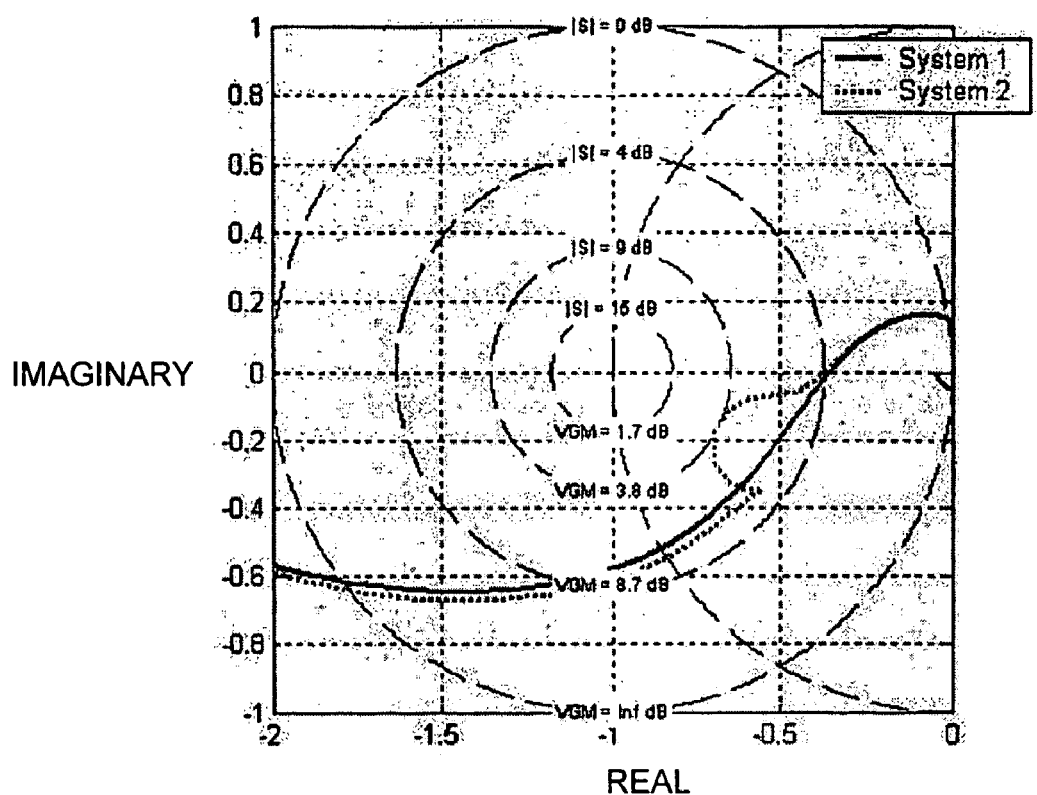

Gain margin, phase margin and VGM are illustrated in FIGS. 4A-C, which are graphs of open loop transfer functions, sensitivity functions, and Nyquist plots for two possible systems (System 1 and System 2). In FIGS. 4A-4C, the graphs for System 1 are shown in solid lines, while the graphs for System 2 are shown in dotted lines. System 2 includes a mode 201 located at 3 kHz, corresponding to a local peak in the sensitivity function shown in FIG. 4B and in the magnitude of the open loop transfer function shown in FIG. 4A.

In the open loop transfer functions shown in FIG. 4A, the gain margin is 9 dB for both System 1 and System 2, since the open loop gain at a phase of −180 degrees is −9 dB. The phase margin for both systems is approximately 30 degrees, since the phase of both systems at the gain crossover frequency is −150 degrees (i.e. 30 degrees away from −180 degrees). However, System 2 is much closer to instability, despite having acceptable gain and phase margins. This is because the mode at 3 kHz results in a peak in the sensitivity function of 9 dB, as shown in FIG. 4B.

In the Nyquist plot of FIG. 4C, circles of constant |S| are plotted along with their corresponding vector gain margins (VGM). VGM is a measure of the distance of the system from the instability point at unity gain and −180 phase (i.e. point (−1, 0) on the Nyquist plot). The Nyquist plot in FIG. 4C shows that System 2 is much closer to the instability point than the gain and phase margins would suggest. For example, even though System 2 has a gain margin of 9 dB, it has a VGM of only about 3.8 dB.

Figure 5A:
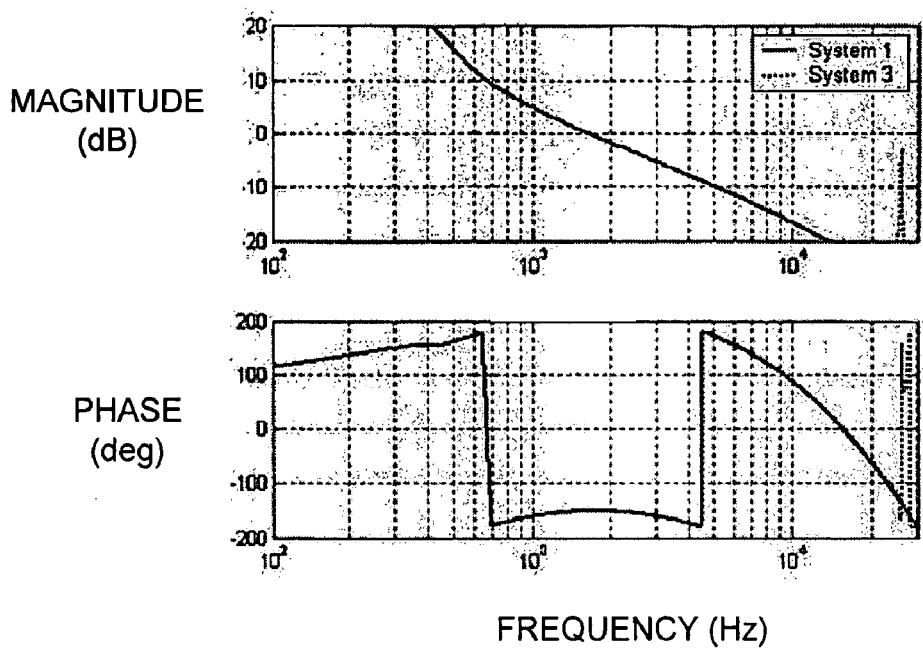
FIGS. 5A-5C are graphs of open loop transfer functions, sensitivity functions, and Nyquist plots for two comparison systems having different suspension modes.
Figure 5B:
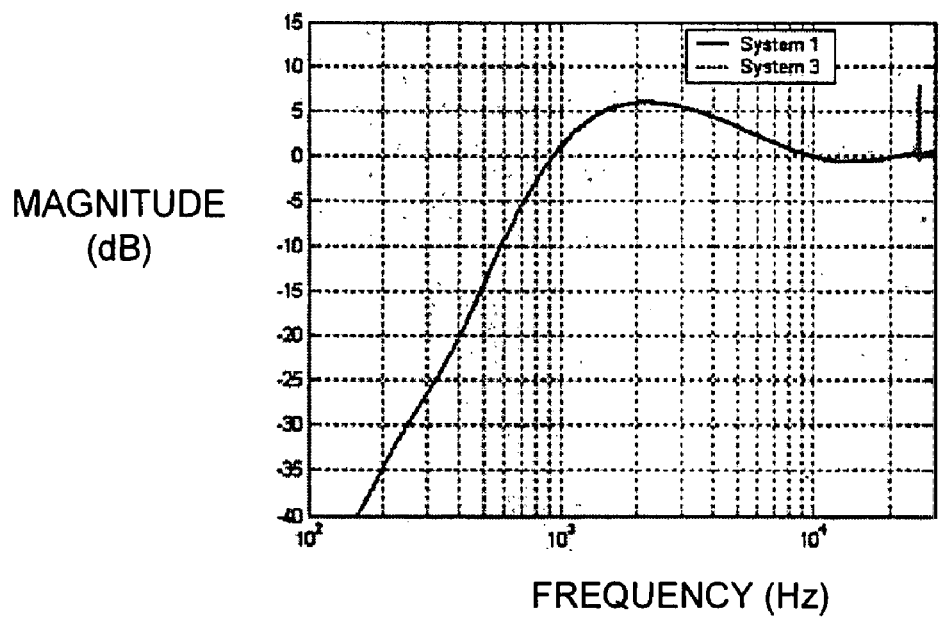
Figure 5C:
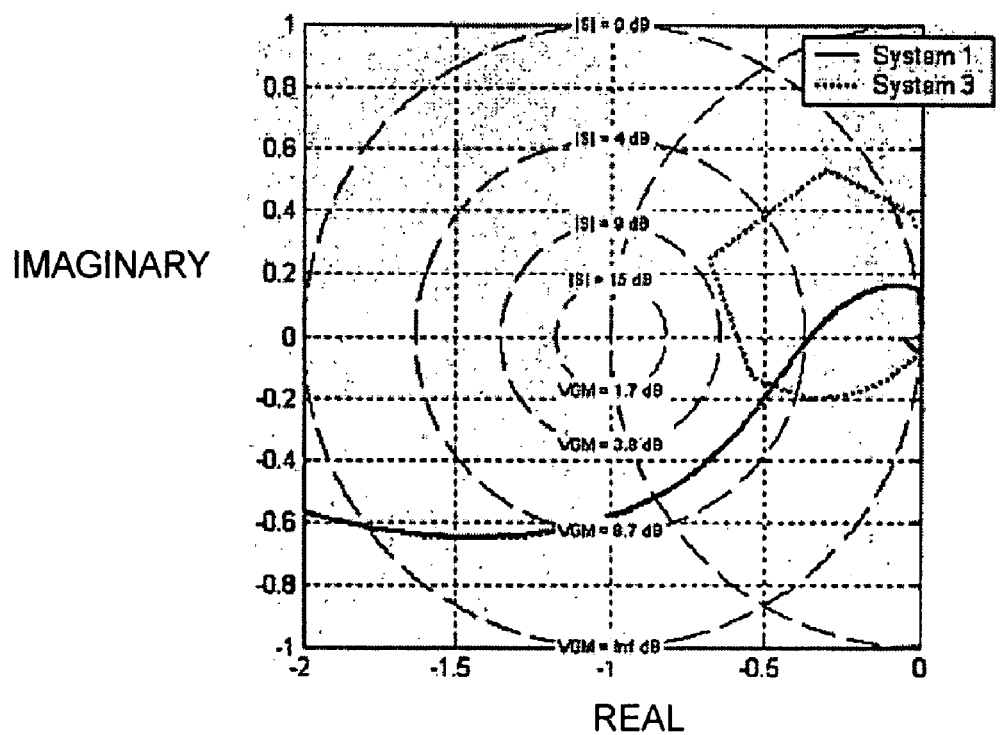

VGM can also be used to detect stability issues at high frequency. For example, reference is made to FIGS. 5A-C, which are graphs of open loop transfer functions, sensitivity functions, and Nyquist plots for two possible systems (System 1 and System 3). In FIGS. 5A-5C, the graphs for System 1 are shown in solid lines, while the graphs for System 3 are shown in dotted lines. From the open loop transfer functions shown in FIG. 5A, it can be determined that the gain margin is 9 dB for both systems and the phase margin is approximately 30 degrees for both systems. However, System 3 has a mode at 26 kHz that results in peaking in the sensitivity function to almost 9 dB, as shown in FIG. 5B. The Nyquist plot in FIG. 5C shows that the VGM of System 3 is about 3.8 dB.

In some cases, when a disk drive 25 encounters a stability problem, as indicated by a larger than normal PES, the servo controller 56 may reduce the loop gain in an attempt to stabilize the system. This approach assumes that the stability of the system is governed by the gain of the controller 110 and not by the properties of the notch filter 114.

Some embodiments examine the peaks of the sensitivity function for several purposes. For example, the peaks of the sensitivity function may be examined in order to adjust the loop gain to increase stability, to monitor high frequency suspension modes in specific frequency ranges, and/or to design notch filters and/or adjust notch filters after manufacturing.

Although there may be several peaks in the sensitivity function, there is only one VGM, since VGM is defined by the largest peak in the sensitivity function. Some embodiments examine the sensitivity peaks, rather than simply focusing on the VGM.

Depending on the frequency of the highest sensitivity peak, two different approaches may be used to stabilize the system. If the highest peak is at low frequency (i.e. below the system mode), then the loop gain is adjusted. If the peak is at high frequency (e.g. above the system mode), then the notch filter is adjusted. Thus, some embodiments may take an approach that targets the source of the instability.

Figure 6A:
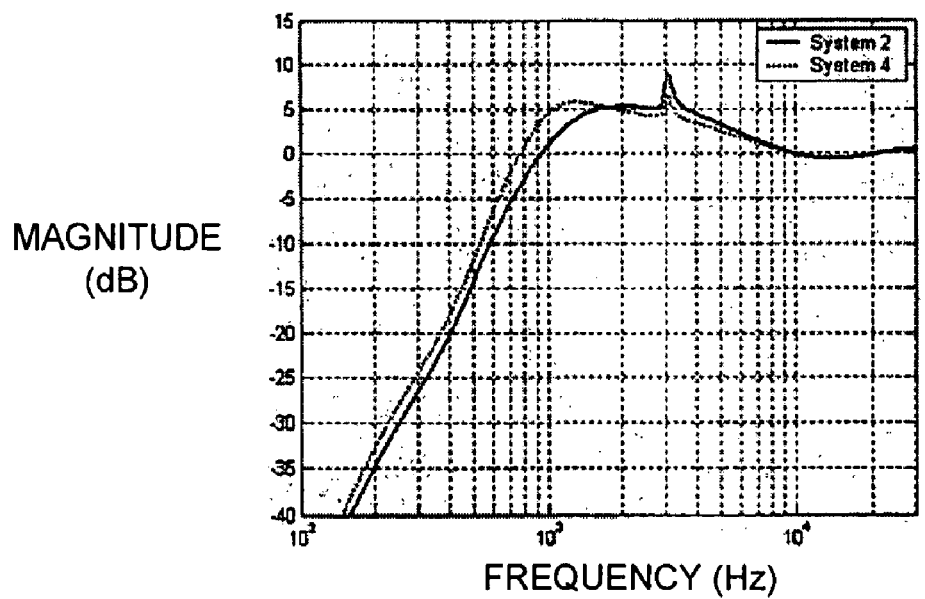
FIGS. 6A-6B are graphs of sensitivity functions, and Nyquist plots illustrating operations according to some embodiments.
Figure 6B:
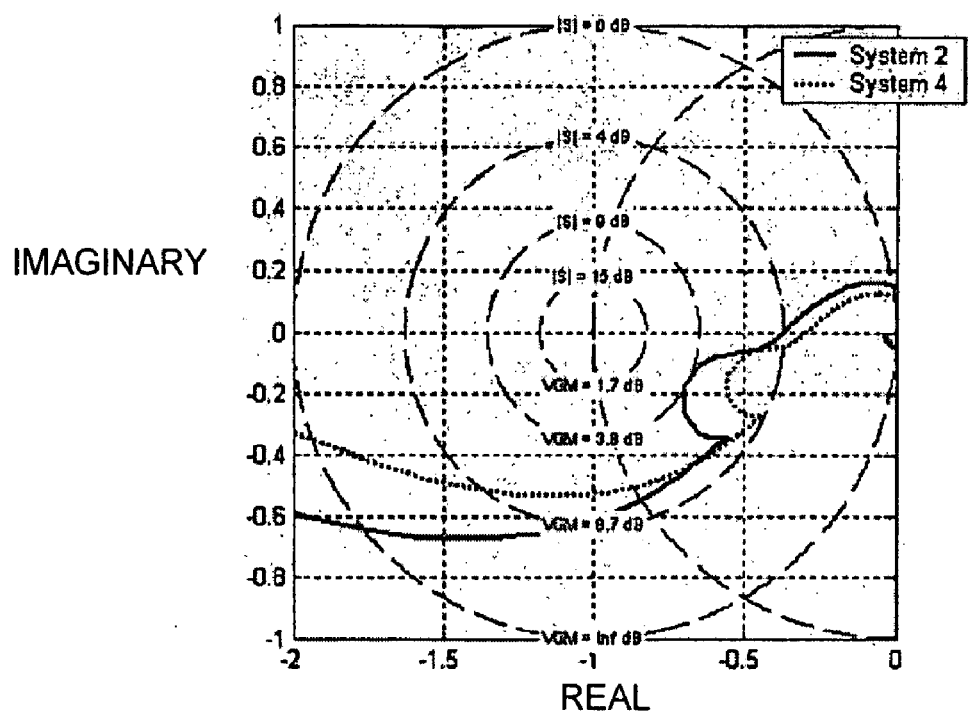

If the frequency corresponding to the sensitivity peak is below the system mode but above the gain crossover frequency, then sensitivity peaking may be reduced by decreasing loop gain. FIGS. 6A and 6B illustrate some effects of reducing the loop gain on System 2, which is described above in connection with FIGS. 4A-4C. System 4 is identical to System 2, but with a 2 dB lower loop gain. As shown in FIG. 6A, reducing the loop gain decreases the sensitivity peak at 3 kHz from 9 dB to 6 dB. However, the value of the sensitivity function below the gain crossover frequency will increase. Thus, some embodiments may attempt to avoid creating another sensitivity function peak below the gain crossover frequency. For example, in some embodiments the loop gain may be increased if the frequency of the sensitivity peak is below the gain crossover frequency.

Figure 7:
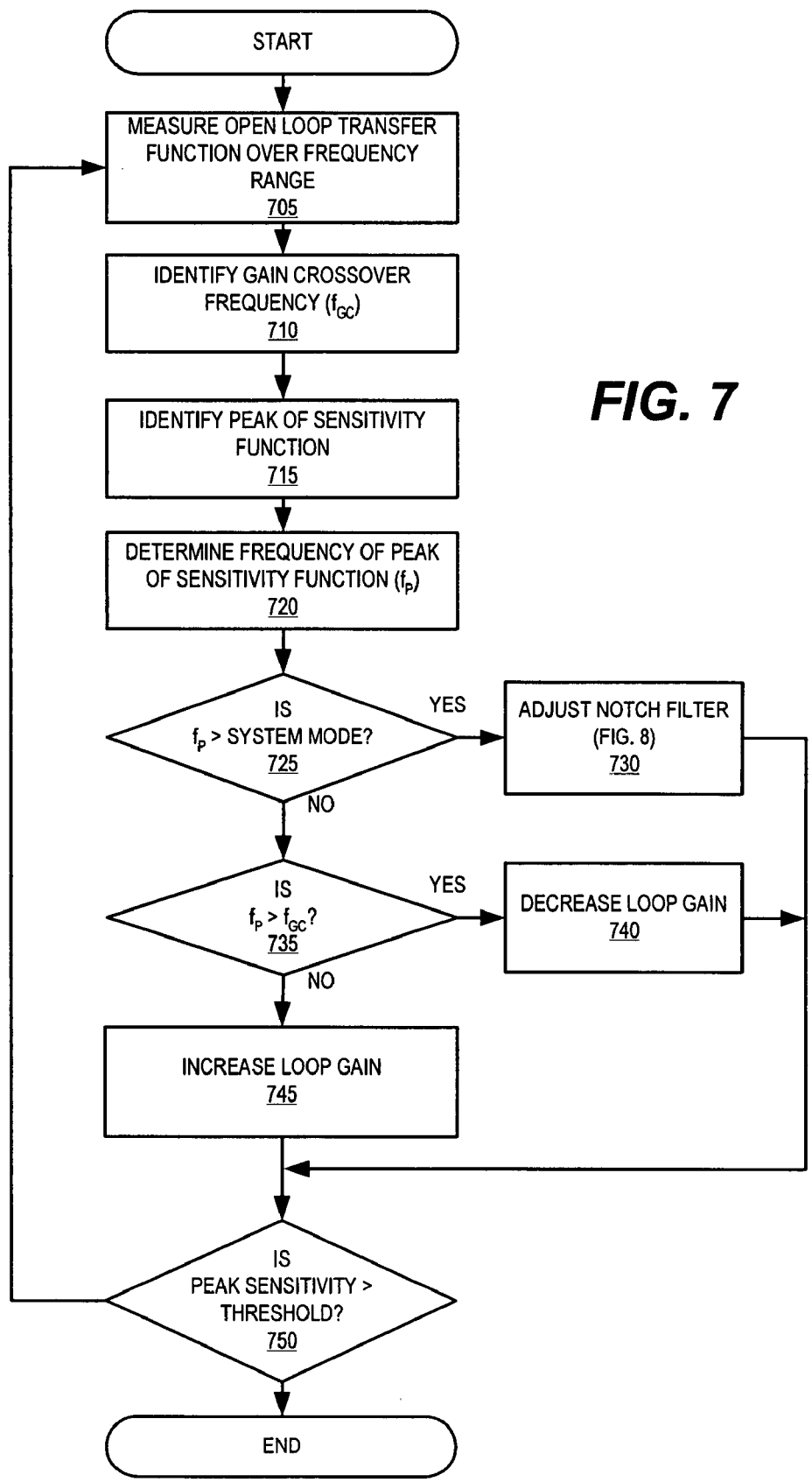
FIGS. 7 and 8 are flowcharts of operations according to some embodiments.
Figure 8:
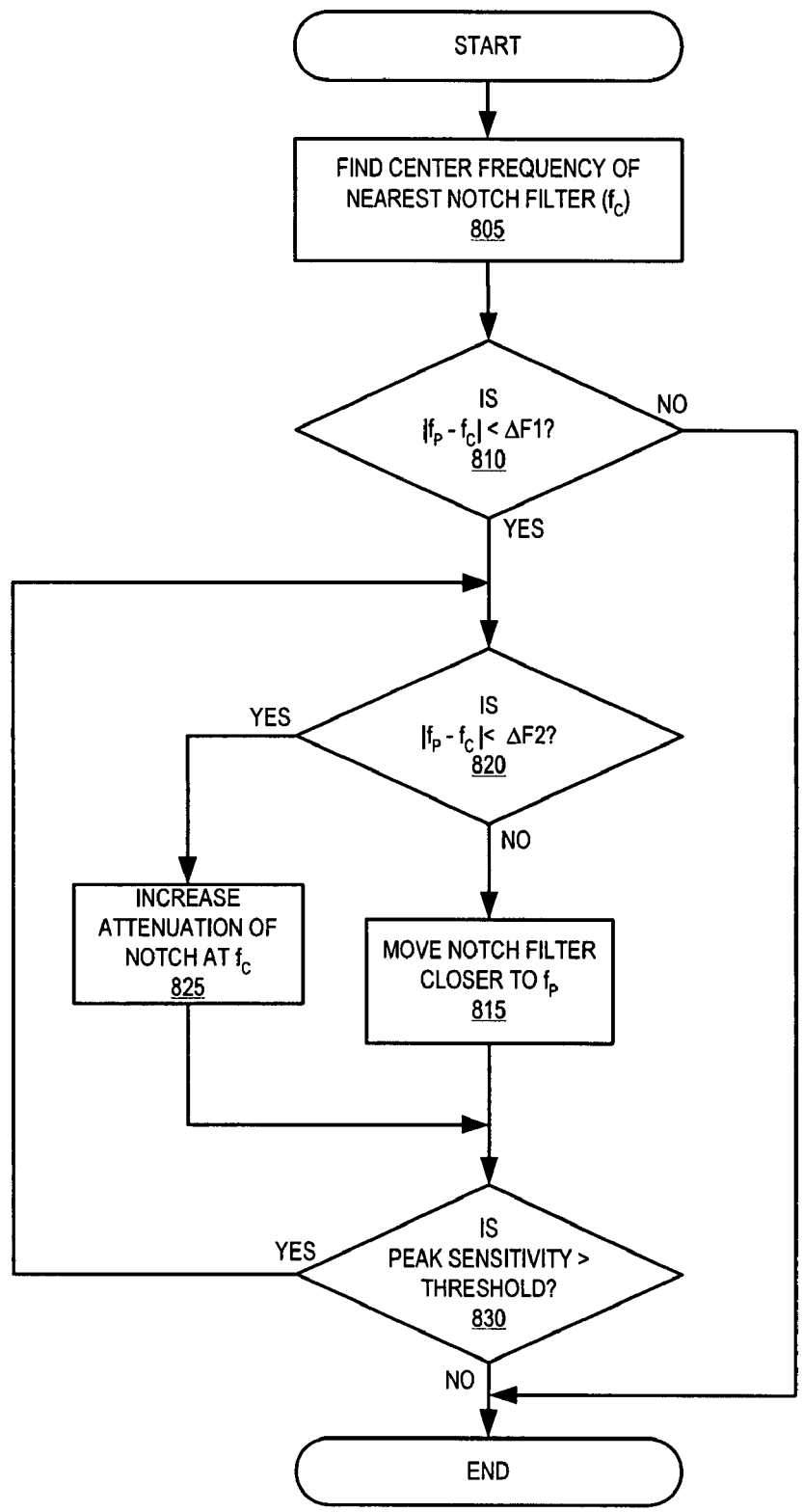

Operations for adjusting loop gain based on the peak value of the sensitivity function are illustrated in FIGS. 7 and 8. Referring to FIG. 7, the open loop transfer function for the disk drive control system is measured over a frequency range of interest (Block 705). The open loop transfer function may be obtained in a conventional manner by applying sinusoidal inputs to the control loop over a frequency range of interest and measuring the resulting PES. The sinusoidal inputs may be obtained, for example, from a lookup table.

The gain crossover frequency ($f_{GC}$) is identified from the transfer function measurements (Block 710). The sensitivity function of the system is obtained from the open loop transfer function measurement. The peak of the sensitivity function is identified (Block 715), and the frequency of the peak of the sensitivity function is determined (Block 720).

The peak of the sensitivity function $f_P$ is compared to the system mode (Block 725). If the peak of the sensitivity function $f_P$ is higher than the system mode, then the properties of the notch filter are adjusted (Block 730). The notch filter may be adjusted as described below in connection with FIG. 8.

If the peak of the sensitivity function $f_P$ is less than the system mode, the peak of the sensitivity function $f_P$ is compared to the gain crossover frequency $f_{GC}$ (Block 735). If the peak of the sensitivity function $f_P$ is at a frequency higher than the gain crossover frequency $f_{GC}$ and lower than the system mode, then the loop gain is decreased to lower the sensitivity function peak (Block 740). However, if the peak of the sensitivity function $f_P$ is at a frequency lower than the gain crossover frequency $f_{GC}$, then the loop gain is increased to lower the sensitivity function peak (Block 745). This may reduce the possibility of creating another peak below the gain crossover frequency that is worse than the original peak.

The peak of the sensitivity function is then remeasured (i.e., re-identified) and compared to the threshold. If the peak is still above the threshold, then operations return to Block 705, and the open loop transfer function is again measured and the loop gain adjusted accordingly.

If the frequency corresponding to the sensitivity peak is above the system mode, then sensitivity peaking may be reduced by adjusting the notch filters as illustrated in FIG. 8. Note that algorithms according to some embodiments are intended to provide gain stabilization at frequencies above the system mode, and may therefore exclude the region immediately following the system mode in a phase stabilized design. Referring to FIG. 8, after determining the frequency of the peak sensitivity $f_P$ and determining that it is above the system mode (see FIG. 7), the center frequency $f_C$ of the nearest notch filter 114 is identified (Block 805). If the difference between the frequency of the peak sensitivity $f_P$ and the center frequency of the notch filter 114 is greater than a first frequency difference $\Delta F1$ (e.g. 2 kHz), then no action is taken, since it is assumed that the notch filter is positioned to address another suspension mode, and it may not be desirable to move a notch filter 114 away from another mode.

If the difference between the frequency of the peak sensitivity and the center frequency of the notch filter is less than $\Delta F1$, then it is determined if the center frequency $f_C$ of the notch filter is approximately equal to the frequency of the peak sensitivity $f_P$ (Block 820) by checking to see if the center frequency of the notch filter $f_C$ is less than a second frequency difference $\Delta F2$ (e.g. 50 Hz). If the center frequency $f_C$ of the notch filter is already located at the frequency of the peak sensitivity (for example, if the center frequency of the notch filter is less than 50 Hz from the frequency of the peak sensitivity), then the attenuation of the notch filter 114 at $f_C$ is increased (Block 825). Otherwise, the center frequency of the notch filter is adjusted by moving the center frequency $f_C$ of the notch filter 114 closer to the peak sensitivity frequency $f_P$ (Block 815). The center frequency of the notch filter 114 may be moved, for example, by adjusting filter coefficients of the notch filter 114.

The sensitivity peak is then remeasured (re-identified) after the adjustment (Block 830). If it is still greater than the threshold, then the center frequency $f_C$ of the notch filter 114 is adjusted again depending on its proximity to the frequency of the sensitivity peak $f_P$ (Blocks 815, 825). Otherwise, operations conclude.

Some embodiments can be used to improve error recovery algorithms employed in a disk drive. As noted above, in some disk drives, error recovery algorithms may simply reduce the loop gain in an attempt to stabilize the system, which assumes that the stability of the system is governed by the controller and not by the notch filter. Some embodiments described herein may be able to reduce instability more effectively because a solution is chosen to stabilize the system based on the frequency of the sensitivity peak.

It will be appreciated that some embodiments can be adapted to emphasize certain frequency ranges, and need not be applied to all frequencies.

Some embodiments may permit adjustment of the loop gain and adjustment of the notch filters to improve stability in the face of unexpected mechanical changes. In addition, some embodiments may be used to report errors in high frequency mode regions.

Furthermore, some embodiments may be implemented for in-drive operation to achieve in-field error correction and/or in-factory yield improvements.

In the drawings and specification, there have been disclosed typical preferred embodiments and, although specific terms are employed, they are used in a generic and descriptive sense only and not for purposes of limitation, the scope being set forth in the following claims.

What is claimed is:

1. A method of adjusting a servo control system, comprising:
    identifying a gain crossover frequency for the servo control system;
    measuring a sensitivity function for the servo control system;
    identifying a sensitivity peak in the sensitivity function;
    comparing a frequency of the sensitivity peak to the gain crossover frequency; and
    adjusting the servo control system in response to the comparison of the frequency of the sensitivity peak to the gain crossover frequency.

2. The method of claim 1, wherein the servo control system includes a controller generating a control signal, a notch filter filtering the control signal, and an actuator moving in response to the control signal, and wherein adjusting the servo control system comprises:
    increasing a gain of the controller if the frequency of the sensitivity peak is less than the gain crossover frequency; and
    decreasing the gain of the controller if the frequency of the sensitivity peak is greater than the gain crossover frequency.

3. The method of claim 1, further comprising:
    measuring an open loop transfer function of the servo control system; and
    determining the gain crossover frequency from the open loop transfer function.

4. The method of claim 1, further comprising:
    re-identifying the sensitivity peak in the sensitivity function after adjusting the servo control system;
    comparing the re-identified sensitivity peak to a threshold; and
    if the re-identified sensitivity peak is above the threshold, comparing a frequency of the re-identified sensitivity peak to the gain crossover frequency, and adjusting the servo control system in response to the comparison of the frequency of the re-identified sensitivity peak to the gain crossover frequency.

5. The method of claim 1, wherein the servo control system includes a controller generating a control signal, a notch filter filtering the control signal, and an actuator moving in response to the control signal, the method further comprising:
    comparing the frequency of the sensitivity peak to a frequency of a system mode of the servo control system; and
    adjusting a property of the notch filter in response to the frequency of the sensitivity peak exceeding the frequency of the system mode.

6. The method of claim 5, further comprising:
    comparing a difference between a center frequency of the notch filter and the frequency of the sensitivity peak with a first threshold; and
    if a difference between the center frequency of the notch filter and the frequency of the sensitivity peak is greater than the first threshold, taking no action with respect to the notch filter.

7. The method of claim 5, further comprising:
    comparing a difference between a center frequency of the notch filter and the frequency of the sensitivity peak with a second threshold; and
    if the difference between the center frequency of the notch filter and the frequency of the sensitivity peak is less than the second threshold, increasing an attenuation of the control signal by the notch filter.

8. The method of claim 7, further comprising:
    if the difference between the center frequency of the notch filter and the frequency of the sensitivity peak is greater than the second threshold, adjusting the notch filter to move the center frequency of the notch filter toward the frequency of the sensitivity peak.

9. The method of claim 5, wherein the property of the notch filter comprises a first property of the notch filter, the method further comprising:
    remeasuring the sensitivity peak in the sensitivity function after adjusting the property of the notch filter;
    comparing the re-identified sensitivity peak to a threshold; and
    if the re-identified sensitivity peak is above the threshold, re-adjusting the first property of the notch filter or adjusting a second property of the notch filter.

10. The method of claim 9, wherein the first property of the notch filter comprises a center frequency of the notch filter and the second property of the notch filter comprises an attenuation of the notch filter.

11. A servo control system, comprising:
    an actuator that moves in response to a control signal;
    a notch filter that filters the control signal; and
    a controller that generates the control signal with a gain adjusted in response to a comparison of a frequency of a sensitivity peak to a gain crossover frequency.

12. The servo control system of claim 11, wherein the controller identifies the gain crossover frequency, generates a sensitivity function for the servo control system, measures the sensitivity peak in the sensitivity function, and compares a frequency of the sensitivity peak to the gain crossover frequency.

13. The servo control system of claim 12, wherein the controller increases the gain of the controller if the frequency of the sensitivity peak is less than the gain crossover frequency, and that decreases the gain of the controller if the frequency of the sensitivity peak is greater than the gain crossover frequency.

14. The servo control system of claim 12, wherein the controller re-identifies the sensitivity peak in the sensitivity function after adjusting the gain of the control signal, and compares the re-identified sensitivity peak to a threshold; and
wherein if the re-identified sensitivity peak is above the threshold, the controller compares a frequency of the re-identified sensitivity peak to the gain crossover frequency, and adjusts the gain of the controller in response to the comparison of the frequency of the re-identified sensitivity peak to the gain crossover frequency.

15. The servo control system of claim 12, wherein the controller compares the frequency of the sensitivity peak to a frequency of a system mode of the servo control system, and adjusts a property of the notch filter in response to the frequency of the sensitivity peak exceeding the frequency of the system mode.

16. The servo control system of claim 15, wherein the controller compares a difference between a center frequency of the notch filter and the frequency of the sensitivity peak with a first threshold; and
if a difference between the center frequency of the notch filter and the frequency of the sensitivity peak is greater than the first threshold, the controller takes no action with respect to the notch filter.

17. The servo control system of claim 16, wherein the controller compares a difference between a center frequency of the notch filter and the frequency of the sensitivity peak with a second threshold; and
if the difference between the center frequency of the notch filter and the frequency of the sensitivity peak is less than the second threshold, the controller increases the attenuation of the notch filter.

18. The servo control system of claim 17, wherein:
if the difference between the center frequency of the notch filter and the frequency of the sensitivity peak is greater than the second threshold, the controller adjusts the notch filter to move the center frequency of the notch filter toward the frequency of the sensitivity peak.

19. The servo control system of claim 15, wherein the property of the notch filter comprises a first property of the notch filter, and wherein the controller re-identifies the sensitivity peak in the sensitivity function after adjusting the property of the notch filter, compares the re-identified sensitivity peak to a threshold, and, if the re-identified sensitivity peak is above the threshold, re-adjusts the first property of the notch filter or adjusts a second property of the notch filter.

20. The servo control system of claim 11, wherein the controller measures an open loop transfer function of the servo control system, and determines the gain crossover frequency from the open loop transfer function.

21. A method of calibrating a servo control system, comprising:
generating a sensitivity function for the servo control system; and
calibrating the servo control system in response to a comparison of a frequency of a sensitivity peak of the sensitivity function to a gain crossover frequency of the servo control system.

22. The method of claim 21, further comprising:
identifying the gain crossover frequency for the servo control system;
measuring the sensitivity peak in the sensitivity function; and
comparing the frequency of the sensitivity peak to the gain crossover frequency.

23. The method of claim 22, wherein the servo control system includes a controller generating a control signal, a notch filter filtering the control signal, and an actuator moving in response to the control signal, and wherein adjusting the servo control system comprises:
increasing a gain of the controller if the frequency of the sensitivity peak is less than the gain crossover frequency; and
decreasing the gain of the controller if the frequency of the sensitivity peak is greater than the gain crossover frequency.

* * * * *